United States Patent

[11] 3,622,375

| [72] | Inventors | Markus Siebel<br>Mainz;<br>Gerhard Buchheister, Wiesbaden-Biebrich;<br>Horst Gebler, Wiesbaden-Biebrich, all of<br>Germany |
|---|---|---|
| [21] | Appl. No. | 778,747 |
| [22] | Filed | Nov. 25, 1968 |
| [45] | Patented | Nov. 23, 1971 |
| [73] | Assignee | Kalle Aktiengesellschaft<br>Wiesbaden-Biebrich, Germany |
| [32] | Priority | Nov. 27, 1967 |
| [33] | | Germany |
| [31] | | K 64020 |

[54] HEAT-SEALABLE ORIENTED POLYPROPYLENE FILM
4 Claims, No Drawings

[52] U.S. Cl. ................................................ 117/122 H,
117/138.8 E, 260/896, 260/897 A
[51] Int. Cl. ................................................ C09j 7/02
[50] Field of Search ........................................ 117/122 H,
122 P, 122 F; 1/138.8 E; 260/896, 897

[56] References Cited
UNITED STATES PATENTS

| 3,265,771 | 8/1966 | Ray et al. | 260/897 UX |
| 3,281,501 | 10/1966 | Coats et al. | 260/897 UX |
| 3,483,023 | 12/1969 | Dotson et al. | 117/122 |
| 3,036,987 | 5/1962 | Ranalli | 117/138.8 UX |
| 3,262,808 | 7/1966 | Crooks et al. | 117/122 UX |
| 3,372,049 | 3/1968 | Schaffhausen | 117/138.8 X |

*Primary Examiner*—William D. Martin
*Assistant Examiner*—Bernard D. Pianalto
*Attorney*—James E. Bryan

ABSTRACT: This invention relates to an oriented polyolefin film having a heat-sealable layer of a thermoplastic polymer thereon in which the polyolefin film is a mixture of 1 to 15 percent by weight, preferably 2 to 8 percent, of polyethylene, and 85 to 99 percent by weight, preferably 92 to 98 percent, of polypropylene.

HEAT-SEALABLE ORIENTED POLYPROPYLENE FILM

Films of isotactic polypropylene which have been oriented in one or more directions are well suited for packaging purposes because of their mechanical strength, optical transparency, and low permeability to water vapor. A requirement for their use in packaging machines is, however, that the films can be welded or heat sealed to each other under the influence of heat and pressure. Whereas nonoriented polypropylene films can be sealed without further treatment, oriented films require a special coating to make them capable of heat sealing.

Such a heat-sealable coating must soften at temperatures at which the supporting oriented polypropylene film does not undergo substantial shrinkage. A further condition is that these layers adhere firmly and permanently to the polypropylene surface, even under adverse climatic conditions. Due to the high stretching and crystallization degree and the nonpolar character of these polypropylene films, this is difficult to achieve. Normally, copolymers based on vinyl acetate, vinyl chloride or vinylidene chloride are used as heat-sealable coatings. Nitrocellulose has also been used as a heat-scalable layer. In all these cases, particularly intensive and uniform treatment by means of electrical discharges and, in most cases, also precoating with an additional anchoring layer is necessary to achieve a good adhesion of these layers to the polypropylene film. In spite of these efforts, the adhesion of these layers to the surface of the polyrpopylene film is not always satisfactory. Particularly in the case of films of a thickness of more than 15$\mu$, such as are required for shockproof packages, the heat-sealing strength is not sufficient in most cases.

Now it has been found that the adhesion of heat-sealable layers may be substantially improved when, in the case of a heat-sealable oriented polyolefin film carrying a known sealing layer of a thermoplastic polymer, the supporting polyolefin film is a mixture of 1 to 15 percent by weight, preferably 2 to 8 percent, of polyethylene, and 85 to 99 percent by weight, preferably 92 to 98 percent, of polypropylene. By using such supporting films, heat-sealable oriented polypropylene films are produced which are better suited to meet practical requirements.

The polyethylene is added to the polypropylene raw material before the production of the film. It is generally known to mix different thermoplastic polymeric materials, including polypropylene and polyethylene, and to produce films from these mixtures. In this manner, especially soft or tough films may be produced which are altered in their mechanical properties. Films having good slipping properties or special optical properties also can be produced from such mixtures. For extrusion coating of paper, e.g., a high flow from the nozzle may be thus achieved.

According to the present invention, however, the proportion of polyethylene added is selected so that no tangible variations in the processing conditions or the mechanical properties can be detected, as compared with films containing no such addition. The extrusion conditions and the stretching ratio do not vary from the standard conditions for polypropylene films. The film produced has the same tensile strength and elongation. Also the stiffness, as judged by determining the elastic modulus of the film, shows practically no deviation.

Surprisingly, however, when coating such films with heat-sealing layers, a marked improvement of the adhesion of these coatings to the support is achieved. The values obtained for the heat-sealing strength exceed 80 g./cm.

The polyethylene used may be either high-pressure polyethylene or low-pressure polyethylene having densities between 0.91 and 0.96 g./cm$^3$. Branched types of a density from 0.91 to 0.93 g./cm$^3$ are preferred. They are added in the form of granules to the polypropylene granulate before extrusion and stretching. The quantity of polyethylene incorporated depends on the one hand upon its compatibility with the polypropylene raw material, i.e., a turbidity of the film which may become apparent must not exceed 8 percent, and, on the other hand, upon the achievable improvement of the heat-sealing strength to values between 80 and 120 g./cm. Polyethylene additions between 1 and about 18 percent, based on the quantity of polypropylene, are suitable. Too high a content of polyethylene adversely affects the optical and mechanical properties of the film, whereas in the case of insufficient additions, an improvement of the heat-sealing strength can no longer be clearly ascertained. Heat-sealable films based on mixtures containing from 2 to 8 percent by weight of polyethylene are preferred.

According to the present invention, stretched polyolefin films are used as supports which have a thickness in the range of about 10 to about 50$\mu$. The improved adhesion of heat-sealable layers is particularly evident in the case of the base films having a thickness between about 15 and 35$\mu$.

The films, which are produced in the normal manner by extrusion of a melt and biaxial stretching, are subjected to an intensive electrical discharge before the heat-sealable layer is applied. Other methods for polarizing the polyolefin surface, such as a flame or chlorine treatment, also are suitable. Then, a heat-sealable layer of a thermoplastic polymer having a softening point below 130° C. is applied. The coating may be applied from a solution in organic solvents or from an aqueous dispersion. The base film used according to the present invention affords special advantages when the coating is applied from an aqueous dispersion. Although this coating method has technical advantages over coating from solutions, experience has shown that a good adhesion of the heat-sealable layers can be achieved less readily by this method.

The following examples further illustrate the invention.

a. The heat-sealing strength is determined by means of a strip 1cm. wide, cut transversely of the sealing weld of the sample. The force in grams per centimeter of width of strip measured during separation of the film in a small tension-tester at a feed of 200mm. per minute serves as a measurement of the sealing strength of the film. The gripped free ends of the sample should form an angle of about 90° with the unseparated film. A sealing weld of a width of 15mm. was made in a pneumatic sealing apparatus manufactured by Messrs. Sentinel, USA, under constant conditions of a sealing temperature of 120° C., a sealing time of 2seconds, and a pressure of 1.3kg./cm.$^2$ b. The values for the mechanical strength were measured by means of a tension tester provided with an electronic recording device. Strips 15 mm. wide were fastened by a length of 100mm. in clamps and stretched at a feed of 100 mm. per minute to the point of rupture. The samples were taken along the longitudinal direction of the film.

c. The elastic modulus serves for judging the stiffness of the film. It is determined in the longitudinal direction of strips 20 mm. wide by means of electronic tension tester, the feed being only 10 percent per minute. For the test, the film is stretched by 0.5 to 0.7 percent and then the angle of ascent of the tangent to the almost straight beginning of the curve on the diagram showing the tensile elongation is measured. (The test is performed at a temperature of 23° C. and a relative humidity of 50percent.)

d. The turbidity of the film is measured photometrically, using a so-called "Ulbricht bulb." The proportion of dispersed light (forward dispersion)—calculated on the quantity of transmitted light—serves as measurement. The method is based on ASTM-D method No. 1003/52, but the angle of incident light blocked out is only about 0.8°. In this way, turbidity values are obtained which as far as possible resemble the conditions in practice.

e. For determining the dimensional stability, samples of a size of 10×10 cm. are kept for 15 minutes in a heating chamber at 120° C. The combined linear reduction in the longitudinal and the transverse direction of the film is designated as the area shrinkage or the shrinkage value.

EXAMPLE 1

Granulated linear polypropylene having a density of 0.91g./cm.³ is thoroughly mixed with 4 percent (based on the quantity of polypropylene) of granulated polyethylene having a density of 0.918 g./cm.³3. A 20μ thick film is produced form this mixture by extrusion and biaxial stretching. The film is then treated on both surfaces with an electrical discharge produced by a 10 kilocycle generator at a voltage which has been transformed to about 8 kilovolts and a current of 0.4 ampere. Then a polyvinylidene copolymer having a content of 90 percent by weight of vinylidene chloride and 10 percent by weight of acrylonitrile and acrylic ester is applied from an aqueous dispersion in such a manner that both sides of the film carry a dry coating of 3μ thickness. The coating is dried in hot air chamber at 110° 125° C.

A heat-sealable film produced in this manner has the following characteristics:

| | |
|---|---|
| Heat-sealing Strength | 80–100 g./cm. |
| Ultimate Tensile Strength | 16 kg./mm.² |
| Elongation at Rupture | 130% |
| Elastic Modulus | 230 kg./mm.² |
| Turbidity | 4.5–5.5% |
| Shrinkage Value | 5.5% |

For a polyprpylene film w which has been prepared in the same manner, but without adding polyethylene, and then provided with a heat-sealable layer, the following properties are found:

| | |
|---|---|
| Heat-Sealing Strength | 40–60 g./cm. |
| Ultimate Tensile Strength | 15 kg./mm.² |
| Elongation at Rupture | 135% |
| Elastic Modulus | 240 kg./mm.² |
| Turbidity | 4–5% |
| Shrinkage Value | 6% |

Whereas the mechanical and optical values of the two films are practically the same, the film produced from the mixture possesses considerably improved heat-sealing properties.

EXAMPLES 2 to 6

Under conditions analogous to those of example 1, polyolefin films of a thickness of 25μ were produced which contained polyropylene and polyethylene in varying proportions by weight. For making them heat sealable, these films were coated in the same manner with an aqueous dispersion of a copolymer containing 60 parts by weight of vinyl chloride and 40 parts by weight of vinyl acetate. The following table shows the heat-sealing strength of these films:

| Example | Polyethylene Addition | Heat-Sealing Strength |
|---|---|---|
| 2 | 2% | 80–100 g./cm. |
| 3 | 4% | 90–120 g./cm. |
| 4 | 6% | 60–100 g./cm. |
| 5 | 8% | 80–100 g./cm. |
| 6 | 10% | 70–100 g./cm. |

The corresponding heat-sealing strength of a 25μ thick film of pure polypropylene was only 50 to 60 g./cm. Within the limits of accuracy of measurement, the mechanical and optical values of the films corresponding to examples 2 to 4 were practically identical to those of films of pure polypropylene.

EXAMPLE 7

A biaxially stretched film of 20μ thickness was produced from a mixture of 96.5 percent by weight of linear polypropylene of a density of 0.906 and 3.5 percent by weight of polyethylene of a density of 0.929. After a conventional corona treatment, the film was coated on both surfaces with an aqueous dispersion of polyvinylidene chloride. The sealing strength of this film was 90 g./cm. Within the limits of accuracy of measurement, the mechanical values of this film corresponded to those of the film of example 1. In contradistinction thereto, a film produced from pure polypropylene had a heat-sealing strength only of about 50 g./cm.

It will obvious to those skilled in the art that many modifications may be made within the scope of the present invention without departing from the spirit thereof, and the invention includes all such modifications.

What is claimed is:

1. An oriented polyolefin film having a heat-sealable layer of a thermoplastic polymer thereon and having improved adhesive properties between the base film and the layer, the polyolefin film being a mixture of 2 to 8 percent by weight of polyethylene having a density of 0.91 to 0.93 g./cm.² and 92 to 98 percent by weight of polypropylene having a density of 0.906 to 0.910 g./cm.³.

2. An oriented polyolefin film according to claim 1 in which the polyolefin film has a thickness of 15 to 35μ.

3. An oriented polyolefin film according to claim 1 in which the polyolefin film has a turbidity below 8 percent and a heat-sealing strength above 80 g./cm.

4. An oriented polyolefin film according to claim 1 in which the turbidity is about 4 to 6 percent and the heat-sealing strength is 80 to 120 g./cm.

* * * * *

UNITED STATES PATENT OFFICE
CERTIFICATE OF CORRECTION

Patent No. 3,622,375      Dated November 23, 1971

Inventor(s)   Markus Seibel, Gerhard Buchheister, and Horst Gebler

It is certified that error appears in the above-identified patent and that said Letters Patent are hereby corrected as shown below:

Column 1, line 21, "scalable" should read - - - sealable - - -.

Column 3, line 6, "3" should be deleted.

Column 3, line 15, "a" should be inserted after "in".

Column 3, line 16, "110° 125° C." should read
- - - 110-125° C. - - -.

Column 4, line 41, after "$cm^3$", the following should be inserted - - - , and having a thickness in the range of about 10 to about 50$\mu$ - - -.

Signed and sealed this 18th day of April 1972.

(SEAL)
Attest:

EDWARD M. FLETCHER, JR.                ROBERT GOTTSCHALK
Attesting Officer                      Commissioner of Patents